(12) United States Patent
Sugrim et al.

(10) Patent No.: US 8,693,825 B2
(45) Date of Patent: Apr. 8, 2014

(54) FERRULE STRUCTURE AND ASSEMBLY FOR LENS TERMINATED FIBER

(75) Inventors: Chandraika (John) Sugrim, Inamn, SC (US); Daiichiro Tanaka, Greer, SC (US); Lalitkumar Bansal, Greenville, SC (US); Ted Lichoulas, Simpsonville, SC (US); Lawrence Srutkowski, Florence, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 469 days.

(21) Appl. No.: 12/810,416

(22) PCT Filed: Jan. 7, 2010

(86) PCT No.: PCT/US2010/020296
§ 371 (c)(1),
(2), (4) Date: Jun. 24, 2010

(87) PCT Pub. No.: WO2010/080860
PCT Pub. Date: Jul. 15, 2010

(65) Prior Publication Data
US 2012/0148193 A1   Jun. 14, 2012

Related U.S. Application Data

(60) Provisional application No. 61/143,243, filed on Jan. 8, 2009.

(51) Int. Cl.
*G02B 6/36* (2006.01)

(52) U.S. Cl.
USPC ............. 385/33; 385/15; 385/34; 385/35; 385/60; 385/61; 385/72; 385/73; 385/74; 385/78; 385/79

(58) Field of Classification Search
USPC ............ 385/15, 33–35, 60–61, 72–74, 78–79
See application file for complete search history.

(56) References Cited

U.S. PATENT DOCUMENTS

| | | | | |
|---|---|---|---|---|
| 4,119,362 A | * | 10/1978 | Holzman | 385/74 |
| 4,781,431 A | * | 11/1988 | Wesson et al. | 385/79 |
| 4,854,663 A | * | 8/1989 | Borsuk et al. | 385/77 |
| 6,282,348 B1 | * | 8/2001 | Carlisle et al. | 385/78 |
| 6,295,393 B1 | * | 9/2001 | Naganuma | 385/11 |
| 6,978,065 B2 | * | 12/2005 | Liu et al. | 385/33 |
| 2004/0156585 A1 | * | 8/2004 | Matusick et al. | 385/33 |
| 2004/0184758 A1 | * | 9/2004 | Liu et al. | 385/147 |
| 2008/0050073 A1 | * | 2/2008 | Kadar-Kallen et al. | 385/79 |

FOREIGN PATENT DOCUMENTS

WO   2004/055563 A1   7/2004
WO   WO 2004/005563 A1 *  7/2004 ............ G02B 6/255

* cited by examiner

*Primary Examiner* — Ryan Lepisto
*Assistant Examiner* — Guy Anderson
(74) *Attorney, Agent, or Firm* — Sughrue Mion, PLLC

(57) ABSTRACT

A ferrule structure including a ferrule having an end face shape configured to incorporate at least a portion of a lens attached to an end of an optical fiber. The end face includes a cavity in which a circumference of the cavity is equal to or less than the outer diameter of the ferrule and larger than in inner diameter of an opening in the ferrule housing an optical fiber.

19 Claims, 3 Drawing Sheets

FERRULE STRUCTURE AND ASSEMBLY FOR LENS TERMINATED FIBER

CROSS-REFERENCE TO RELATED APPLICATIONS

This application claims the benefit of U.S. Provisional Patent Application No. 61/143,243 filed on Jan. 8, 2009 in the U.S. Patent and Trademark Office, the disclosure of which is incorporated herein in its entirety by reference.

BACKGROUND OF THE INVENTION

1. Field of the Invention

Apparatuses consistent with the present invention relates to a ferrule structure supporting a lens and an optical fiber.

2. Description of the Related Art

Generally, there are many different schemes for coupling free space lasers with optical fibers. However, known devices exhibit several drawbacks. One such configuration includes a collimating lens positioned at a distance from the end of an optical fiber. In this system, it is necessary to precisely align the optical fiber with the collimating lens. Because of the displacement of the core of the fiber which occurs during the fiber drawing process leading to core eccentricity, this alignment becomes difficult. As a precise alignment is difficult to achieve, these coupling systems may exhibit a radial offset in an optical beam emanating from the collimating lens. Similar offsets occur in coupling systems in which the optical fiber receives light from a laser source. As a result, the coupled energy between an optical fiber and a free laser will be reduced.

Further, in systems subject to mechanical vibrations, it is nearly impossible to maintain a precise alignment.

Finally, the concentration of energy received at the end face of an optical fiber may result in a high thermal load. The existing coupling systems exhibit poor thermal conduction between the optical fiber end face and its surroundings. Consequently, high temperatures may damage the materials of the coupling system.

Thus, there is a need for an improved system for coupling free space lasers with optical fibers that minimizes the difficulties associated with optical fiber alignment and thermal loading.

SUMMARY OF THE INVENTION

An aspect of the invention is to provide an apparatus for coupling a free laser and an optical fiber that requires less precision in alignment and exhibits improved thermal characteristics.

In accordance with an aspect of the present invention, there is provided an optical device including a collimating optical portion, an optical fiber having a first end spaced from the collimating optical portion, a lens disposed on the first end of the optical fiber, a ferrule contacting the optical fiber and the lens, and a housing that supports the collimating optical device and the ferrule along an optical axis.

The lens of the optical device is radially larger than the optical fiber in a direction orthogonal to the optical axis. The lens may be a collimating lens. Further, the lens may take the shape of a ball lens, a cone shaped lens or a cylindrical lens.

According to another aspect of the invention, the optical device may in include a cavity portion formed in a side of the ferrule facing the collimating optical portion wherein a portion of the lens is disposed within the cavity portion. The cavity portion may be configured to conform to the shape of the portion of the lens disposed within the cavity.

According to another aspect of the invention, the coefficient of thermal expansion of the lens is substantially similar to the coefficient of thermal expansion of the optical fiber.

According to another aspect of the invention, a ferrule structure is provided which includes a ferrule having an end face shape configured to incorporate at least a portion of a lens attached to an end of an optical fiber, the end face shape comprising a cavity, wherein a circumference of the cavity is equal to or less than the outer diameter of the ferrule and larger than in inner diameter of an opening in the ferrule housing an optical fiber.

The end face shape may be a cone shape, a hemisphere shape or a cylindrical shape.

The ferrule may comprise a metallic material, a ceramic material or a polymer material.

The ferrule structure may also include a coating of a material of high thermal conductivity on the surface of the cavity. The coating may be an epoxy, a silver epoxy, or a mixture of carbon nano-tubes and a filler epoxy.

BRIEF DESCRIPTION OF THE DRAWINGS

The above and/or other aspects of the invention will become apparent and more readily appreciated from the following description of the exemplary embodiments, taken in conjunction with the accompanying drawings in which.

DETAILED DESCRIPTION OF THE EXEMPLARY EMBODIMENTS

Hereinafter the exemplary embodiments of the present invention will be described in detail with reference to the accompanying drawings.

Figure 1:
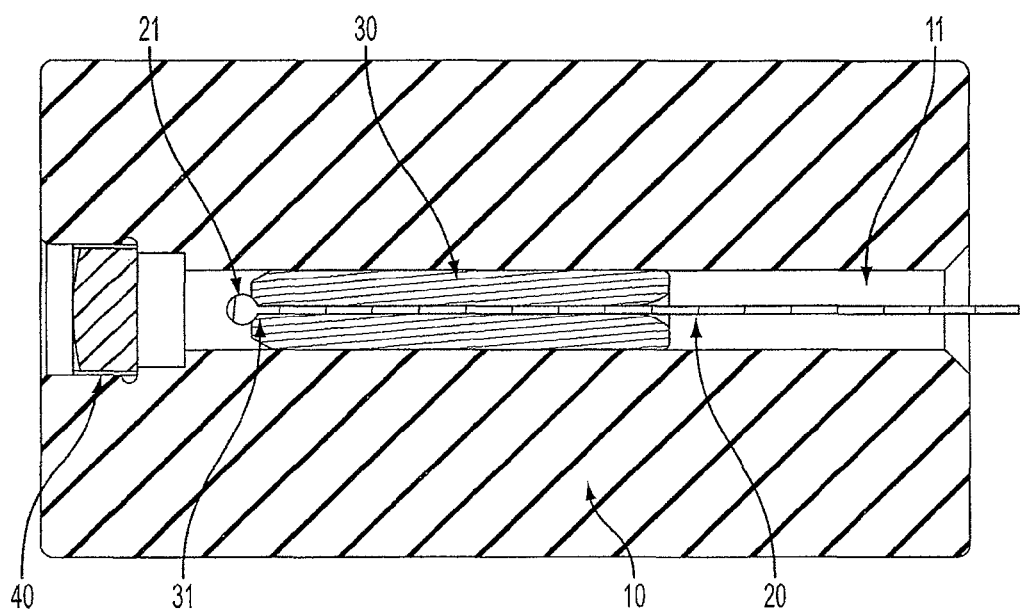
FIG. 1 is a side sectional view illustrating a ferrule assembly structure according to an exemplary embodiment.
Figure 2:
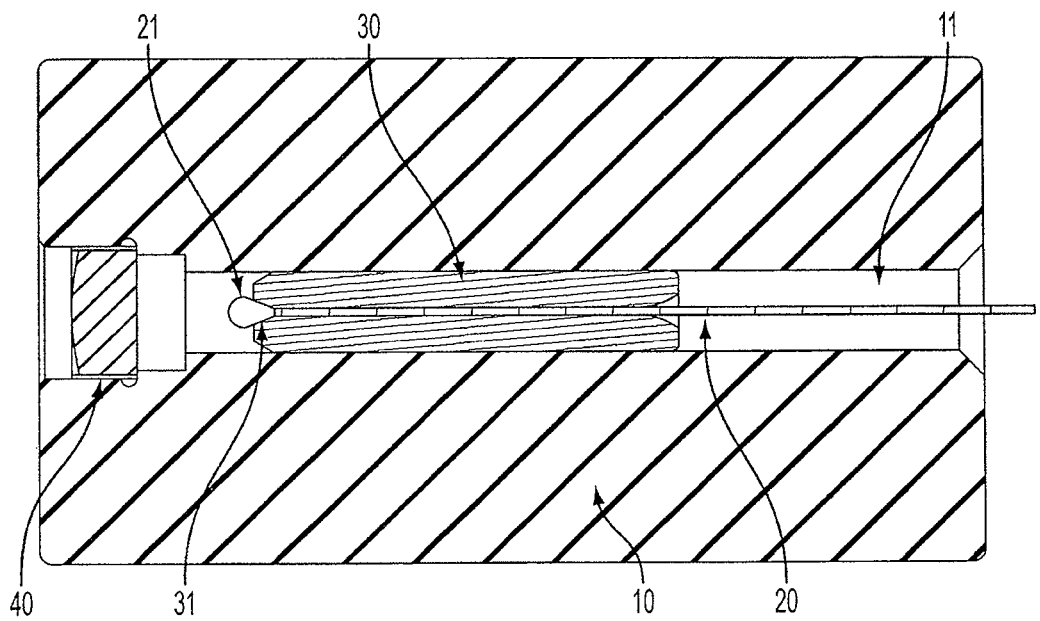
FIG. 2 is a side sectional view illustrating a ferrule assembly structure according to another exemplary embodiment.
Figure 3:
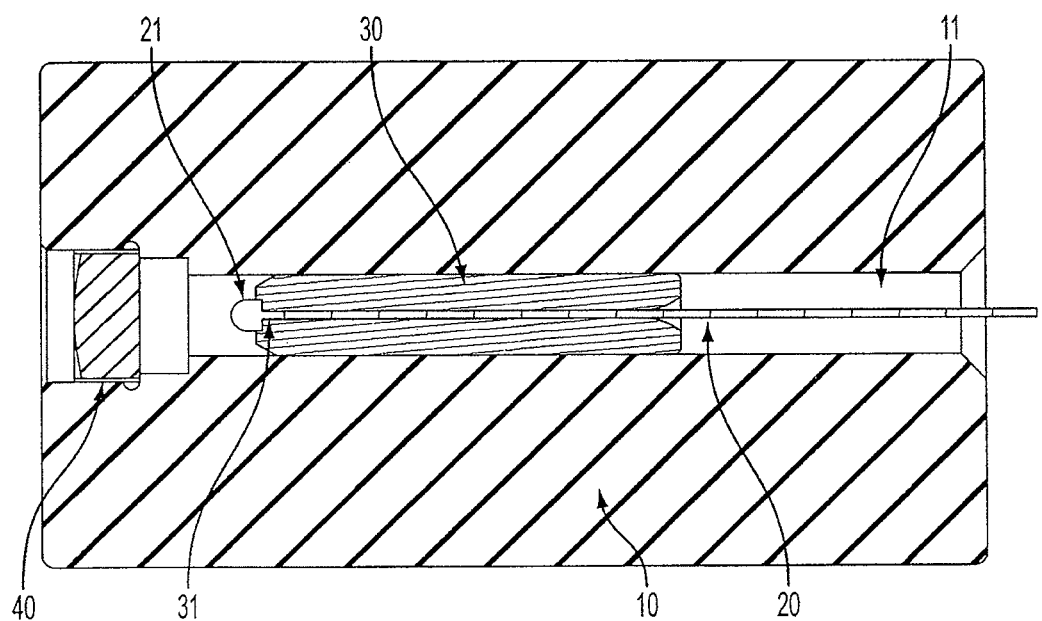
FIG. 3 is a side sectional view illustrating a ferrule assembly structure according to another exemplary embodiment.

A ferrule structure according to a first exemplary embodiment of the invention is shown in FIGS. 1-3. As shown, the ferrule 30 has a through hole for supporting an optical fiber 20. The optical fiber 20 enters on one side of the ferrule 30 and extends through the ferrule 30 to a lens 21 disposed on the other side of the ferrule 30.

The ferrule 30 also includes a ferrule cavity 31 which receives at least a portion of the lens 21. This ferrule cavity 31 is shaped to conform to the shape of the lens 21 in order to provide a surface contact area for the transfer of heat generated in the lens 21 to the ferrule 30. This conforming shape also provides support for the lens 21. Thus, the integrity of the lens 21 and optical fiber 20 combination may be improved.

The lens 21 may also be attached to or made integral with the optical fiber 20. The lens 21 and the optical fiber 21 may be made of the same material, although this is not necessary. However, if the material composition between the ball lens and the optical fiber 20 is different, in some applications it may be beneficial if the coefficient of thermal expansion is substantially similar between the different materials to prevent undue stress or separation between the lens 21 and the optical fiber 20 as a result of thermal loading.

The lens 21 may be in the form of a cone, a cylinder or a ball. If the lens is to provide for light collimation, the outer surface distant from the optical fiber may be a curve or spherical surface.

The ferrule 30 may be comprised of a metallic material, a ceramic material, a polymer material, a silicon oxide, or the like.

According to another exemplary embodiment, the ferrule structure described above may also include a coating of a material having high thermal conductivity. This material may be an epoxy, a silver epoxy, a mixture of carbon nano-tubes and a filer epoxy or other similar material.

A ferrule structure and assembly according to another exemplary embodiment relates to a structure that provides for the alignment of collimating optics 40, such as a collimating lens, that is spaced a distance from an optical fiber 20. As shown in FIGS. 1-3, the assembly includes an opening 11 extending along an optical axis from one side of the housing 10 to another side of the housing 10.

The collimating optics 40 is positioned on one side of the housing 10. In this exemplary embodiment, the collimating optics 40 is held as a result of direct contact with the housing 10. However, other structures may be imposed between the collimating optics 40 and the housing 10 as would be recognized by those of ordinary skill in the art. These other structures may provide for securing or adjusting the alignment of the collimating optics 40.

This coupling system may also aid in stripping out the cladding mode of the launch light into the optical fiber and provides a beam dump for the cladding.

An optical fiber 20 extends through the opening 11 of the housing 10 on a side of the housing 10 opposite the collimating optics 40. The optical fiber 20 is held by a ferrule 30 that is sized to fit securely into a portion of the opening 11. The optical fiber 20 extends through the ferrule 30 to contact a lens 21 positioned on a side of the ferrule 30 facing the collimating optics 40.

The lens 21 is dimensionally larger than the optical fiber 20 in a radial direction with respect to the optical axis of the optical fiber 20. Further, the lens 21 may function as a collimating lens. As such, the lens 21 may reduce the required precision of alignment between the collimating optics 40 and the optical fiber 20.

Additionally, the lens 21 directly contacts a surface of the ferrule 30. This contact increases the ability of the ferrule to remove heat from the system. Further, the end of the ferrule 30 may be configured with a ferrule cavity 31 sized to receive a portion of the lens 21. By attaching the lens 21 to the ferrule cavity 31 of the ferrule 30, the contact area for heat removal is increased. The structural rigidity between the lens 21 and the collimating optics 40 is also increased when a portion of the lens 21 is received in the ferrule cavity 31.

In the embodiment shown in FIG. 1, the lens 21 is a ball lens. However, the present invention is not limited to a ball structure. Further, this ball lens may be attached to the optical fiber 20. Also, the ball lens may either be made of the same material or of a different material than the optical fiber. However, if the material composition between the ball lens and the optical fiber 20 is different, in some applications it may be beneficial if the coefficient of thermal expansion is substantially similar between the different materials to prevent undue stress or separation between the lens 21 and the optical fiber 20 as a result of thermal loading.

In this configuration, light can be transmitted through the opening 11 of the housing in either direction. For example, if a free space laser is to be coupled to the optical fiber 20, light is received through the collimating optics 40 which directs the light toward the lens 21. Because the lens 21 is dimensionally larger than the optical fiber 20, less precision is required of the alignment between the collimating optics 40 and the lens 21 than is required between a direct coupling to the optical fiber 20.

Additionally, the structural rigidity provided by the ferrule cavity 31 support of the lens 21 and the reduction of the required alignment precision both aid in reducing the impact of vibrations on the coupling system. By capturing the lens in this fashion, a higher degree of mechanical stability is attainable over a wider range of mechanical frequencies.

Furthermore, the additional surface contact area generated between the lens 21 and the ferrule 30 provide for increased energy removal form the light coupling optics. This may increase the thermal capacity of the device and permit an increase in the overall coupling power.

On the other hand, the light may be transmitted through the optical fiber 20 toward the lens 21 and then through the collimating optics 40 for form a free space laser.

Although a few exemplary embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical device comprising:
a collimating optical portion;
an optical fiber having a first end spaced from the collimating optical portion;
a lens disposed on the first end of the optical fiber;
a ferrule contacting the optical fiber and the lens; and
a housing that supports the collimating optical device and the ferrule along an optical axis;
wherein the ferrule comprises a cavity portion formed in an end of the ferrule facing the collimating optical portion wherein a portion of the lens is disposed within the cavity portion, and wherein a circumference of the cavity portion is equal to or less than an outer diameter of the ferrule and larger than an inner diameter of an opening in the ferrule housing the optical fiber; and
wherein the ferrule further comprises a coating of a material of high thermal conductivity on a surface of the cavity portion.

2. The optical device according to claim 1, wherein the lens is radially larger than the optical fiber in a direction orthogonal to the optical axis.

3. The optical device according to claim 1, wherein the lens is a collimating lens.

4. The optical device according to claim 1, wherein the lens is a ball lens.

5. The optical device according to claim 1, the cavity portion conforms to the shape of the portion of the lens disposed within the cavity portion.

6. The optical device according to claim 5, wherein the lens is a ball lens.

7. The optical device according to claim 1, wherein a coefficient of thermal expansion of the lens is substantially similar to a coefficient of thermal expansion of the optical fiber.

8. The optical device according to claim 1, wherein a portion of the lens contacting the ferrule is a cone shape.

9. The optical device according to claim 1, wherein a portion of the lens contacting the ferrule is a cylindrical shape.

10. The optical device according to claim 1, wherein a portion of the lens contacting the ferrule is a hemisphere shape.

11. A ferrule structure comprising:
a ferrule having an end face shape configured to incorporate at least a portion of a lens attached to an end of an optical fiber, the end face shape comprising a cavity, and
a coating of a material of high thermal conductivity on the surface of the cavity,
wherein a circumference of the cavity is equal to or less than the outer diameter of the ferrule and larger than in inner diameter of an opening in the ferrule housing an optical fiber.

12. The ferrule structure according to claim 11, wherein the end face shape is a cone shape.

13. The ferrule structure according to claim 11, wherein the end face shape is a hemisphere shape.

14. The ferrule structure according to claim 11, wherein the ferrule comprises a metallic material.

15. The ferrule structure according to claim 11, wherein the ferrule comprises a ceramic material.

16. The ferrule structure according to claim 11, wherein the ferrule comprises a polymer material.

17. The ferrule structure according to claim 11, wherein the coating is an epoxy.

18. The ferrule structure according to claim 11, wherein the coating is a silver epoxy.

19. The ferrule structure according to claim 11, wherein the coating comprises a mixture of carbon nano-tubes and a filler epoxy.

\* \* \* \* \*